(12) United States Patent
Rao et al.

(10) Patent No.: US 12,078,003 B2
(45) Date of Patent: Sep. 3, 2024

(54) ACTIVE FRONT STRUCTURE FOR VEHICLE

(71) Applicant: Honda Motor Co., Ltd., Tokyo (JP)

(72) Inventors: Pratap Thamanna Rao, Columbus, OH (US); Pirooz Moradnia, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 275 days.

(21) Appl. No.: 17/488,557

(22) Filed: Sep. 29, 2021

(65) Prior Publication Data
US 2023/0094488 A1    Mar. 30, 2023

(51) Int. Cl.
| | |
|---|---|
| *B62D 25/08* | (2006.01) |
| *B60Q 3/30* | (2017.01) |
| *B62D 25/12* | (2006.01) |
| *E05F 15/71* | (2015.01) |

(52) U.S. Cl.
CPC ............. *E05F 15/71* (2015.01); *B60Q 3/30* (2017.02); *B62D 25/085* (2013.01); *B62D 25/12* (2013.01); *E05Y 2400/40* (2013.01); *E05Y 2400/44* (2013.01); *E05Y 2900/536* (2013.01)

(58) Field of Classification Search
CPC ......... E05F 15/71; B60Q 3/30; B60Q 1/0035; B60Q 1/0041; B60Q 1/2661; B62D 25/085; B62D 25/12; B62D 35/005; B62D 25/105; E05Y 2400/40; E05Y 2400/44; E05Y 2900/536; E05D 2003/163; E05D 15/46
USPC ..................... 296/187.03, 193.11, 180.1, 215
See application file for complete search history.

(56) References Cited

U.S. PATENT DOCUMENTS

| | | | |
|---|---|---|---|
| 6,637,536 B1 | 10/2003 | Polz et al. | |
| 6,802,556 B2 | 10/2004 | Mattsson et al. | |
| 7,055,891 B2* | 6/2006 | Jungert | B62D 35/005 |
| | | | 296/180.5 |
| 7,303,041 B2 | 12/2007 | Stuve | |
| 7,413,049 B2 | 8/2008 | Schramm et al. | |
| 7,559,399 B2* | 7/2009 | Lewis | B60R 21/38 |
| | | | 180/274 |
| 7,571,955 B2 | 8/2009 | Nagae et al. | |

(Continued)

FOREIGN PATENT DOCUMENTS

| | | |
|---|---|---|
| DE | 102009048947 A1 | 4/2011 |
| DE | 102015102018 A1 | 8/2015 |

(Continued)

*Primary Examiner* — Pinel E Romain
(74) *Attorney, Agent, or Firm* — Plumsea Law Group, LLC (57) ABSTRACT

A vehicle including a vehicle hood disposed over a front end compartment of the vehicle, the hood having a front end and a rear end, the rear end being proximal to a front windshield area of the vehicle; at least one hood actuator operably coupled to the hood, the at least one hood actuator being configured to move at least a portion of the hood relative to the front end compartment; and a controller in communication with the at least one hood actuator, the controller being configured to control the at least one hood actuator in response to a predetermined vehicle operating condition. The hood further includes an active hinge defining a hood pivot axis disposed between the front end and the rear end, whereby the at least one hood actuator is configured to move only a forward portion of the hood disposed between the active hinge and the front end of the hood.

20 Claims, 7 Drawing Sheets

(56) References Cited

U.S. PATENT DOCUMENTS

| | | | |
|---|---|---|---|
| 7,931,111 B2* | 4/2011 | Kim | B60R 21/38 |
| | | | 296/193.11 |
| 7,997,375 B2 | 8/2011 | Shaw | |
| 8,534,410 B2 | 9/2013 | Nakaura et al. | |
| 9,205,803 B2* | 12/2015 | Farooq | B60R 21/38 |
| 9,457,762 B2 | 10/2016 | Jayasuriya et al. | |
| 9,950,612 B2* | 4/2018 | Miller | B60K 11/085 |
| 10,023,241 B2* | 7/2018 | Umemoto | B62D 25/161 |
| 10,457,114 B2 | 10/2019 | Del Gaizo et al. | |
| 10,577,034 B2* | 3/2020 | Thompson | B60K 11/085 |
| 10,717,471 B2* | 7/2020 | Glickman | B60Q 3/30 |
| 10,975,599 B2* | 4/2021 | Sasaki | B62D 25/105 |
| 2007/0125589 A1 | 6/2007 | Murphy | |
| 2017/0233012 A1* | 8/2017 | Legrice | B62D 25/12 |
| | | | 296/193.11 |
| 2017/0240225 A1* | 8/2017 | Gaylard | B60K 11/06 |
| 2019/0152426 A1* | 5/2019 | Szente | E05B 77/08 |
| 2022/0372805 A1* | 11/2022 | Randolph | E05D 3/16 |

FOREIGN PATENT DOCUMENTS

| | | |
|---|---|---|
| DE | 102015122949 A1 | 7/2016 |
| DE | 102006061367 B4 | 7/2020 |
| EP | 0926018 B1 | 7/2004 |
| EP | 1500562 B1 | 9/2006 |
| JP | 2008120117 A | 5/2008 |
| JP | 5203764 B2 | 6/2013 |
| WO | WO-2018150110 A1 * | 8/2018 |

\* cited by examiner

ACTIVE FRONT STRUCTURE FOR VEHICLE

BACKGROUND

1. Field of the Disclosure

The present disclosure relates to an active front hood for a vehicle and, more particularly, to an active front hood having a first more visually pleasing configuration and a second more aerodynamically effective configuration.

2. Description of Related Art

Automobile design encompasses many factors influencing the multitude of systems within each vehicle, including but not limited to cooling systems, lighting systems and overall vehicle styling.

For example, in addition to appearance, minor design modifications to the front end or hood design of a vehicle can result in drastically different aerodynamic performance of the vehicle as well as vehicle cooling properties.

There is thus a need in the art for a vehicle front end hood design that can satisfy these competing needs to provide both appealing aesthetics and aerodynamic effectiveness.

SUMMARY

Current aesthetic preferences for a vehicle front end is to have a higher, box-like front that gives the impression of a sportier styling; however, such higher front ends of the vehicle often lead to poor aerodynamic performance. The disclosure herein addresses these seemingly opposite design considerations by providing for a lowering of the hood, or at least a portion thereof, when the vehicle is in operation at a predetermined highway speed, or under other operating conditions, in order to improve aerodynamic performance when appearance is not a prioritized concern.

In one aspect, the disclosure provides a vehicle having a vehicle hood disposed over a front end compartment of the vehicle, the hood having a front end and a rear end, the rear end being proximal to a front windshield area of the vehicle; at least one hood actuator operably coupled to the hood, the at least one hood actuator being configured to move at least a portion of the hood relative to the front end compartment; and a controller in communication with the at least one hood actuator, the controller being configured to control the at least one hood actuator in response to a predetermined vehicle condition. The hood further includes an active hinge defining a hood pivot axis disposed between the front end and the rear end, whereby the at least one hood actuator is configured to move only a forward portion of the hood disposed between the active hinge and the front end of the hood.

Another aspect of the disclosure provides an active hood system for a vehicle including a hood covering a front end compartment of the vehicle, the hood having a front end and a rear end, the rear end being proximal to a front windshield area of the vehicle; at least one actuator operably coupled to the hood and configured to move at least a portion of the hood between a first raised position and second lower position; and at least one upper air guide secured to the hood and configured for movement together with the hood between a first configuration and a second configuration, the first configuration of the at least one upper air guide defining an air flow path for oncoming ambient air into the front end compartment when the hood is disposed in the first raised position, and the second configuration of the at least one upper air guide being configured to close the air flow path for oncoming ambient air into the front end compartment when the hood is disposed in the second lower position.

Another aspect of the disclosure provides a method for operating a vehicle having an active hood including providing a vehicle hood disposed over a front end compartment of the vehicle, the hood having a front end, a rear end proximal to a front windshield area of the vehicle, and an active hinge defining a hood pivot axis disposed between the front end and the rear end; actuating at least one hood actuator operably coupled to the hood; raising only a forward portion of the hood disposed between the active hinge and the front end of the hood to a first position; and lowering only the forward portion of the hood to a second position.

In another aspect, the disclosure provides a vehicle having a hood disposed over a front end compartment of the vehicle, the hood having a front end and a rear end, the rear end being proximal to a front windshield area of the vehicle; at least one hood actuator operably coupled to the hood, the at least one hood actuator being configured to raise and lower at least a portion of the hood relative to the front end compartment; and at least one light emitting device secured to the hood and configured to move together with the hood. Further, when the hood is in a first raised configuration, the at least one light emitting device is disposed in a first position and illumination from the at least one light emitting device is visible though an upper opening of the vehicle, and, when the hood is in a second lower configuration, the at least one light emitting device is disposed in a second position and illumination from the at least one light emitting device is visible through a lower opening of the vehicle.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

The disclosure herein is directed to an "active" front hood 10 for a vehicle that is higher or raised when parked or operating at low speeds to maintain a desired more "box-like" front end styling but, when the speed of the vehicle increases, the hood moves down to a lower and thus more aerodynamically effective position. Current aesthetic preferences for a vehicle front end is to have a higher, box-like front that gives the impression of a sportier, bolder styling; however, aerodynamic design preferences favor a lower front end or hood which lessens the drag on the vehicle and thereby improves the overall vehicle performance. This is addressed by the disclosure herein by providing for a lowering of the hood, or at least a portion thereof, when the vehicle is in operation at predetermined speeds or operating conditions in order to improve aerodynamic performance.

Figure 1:
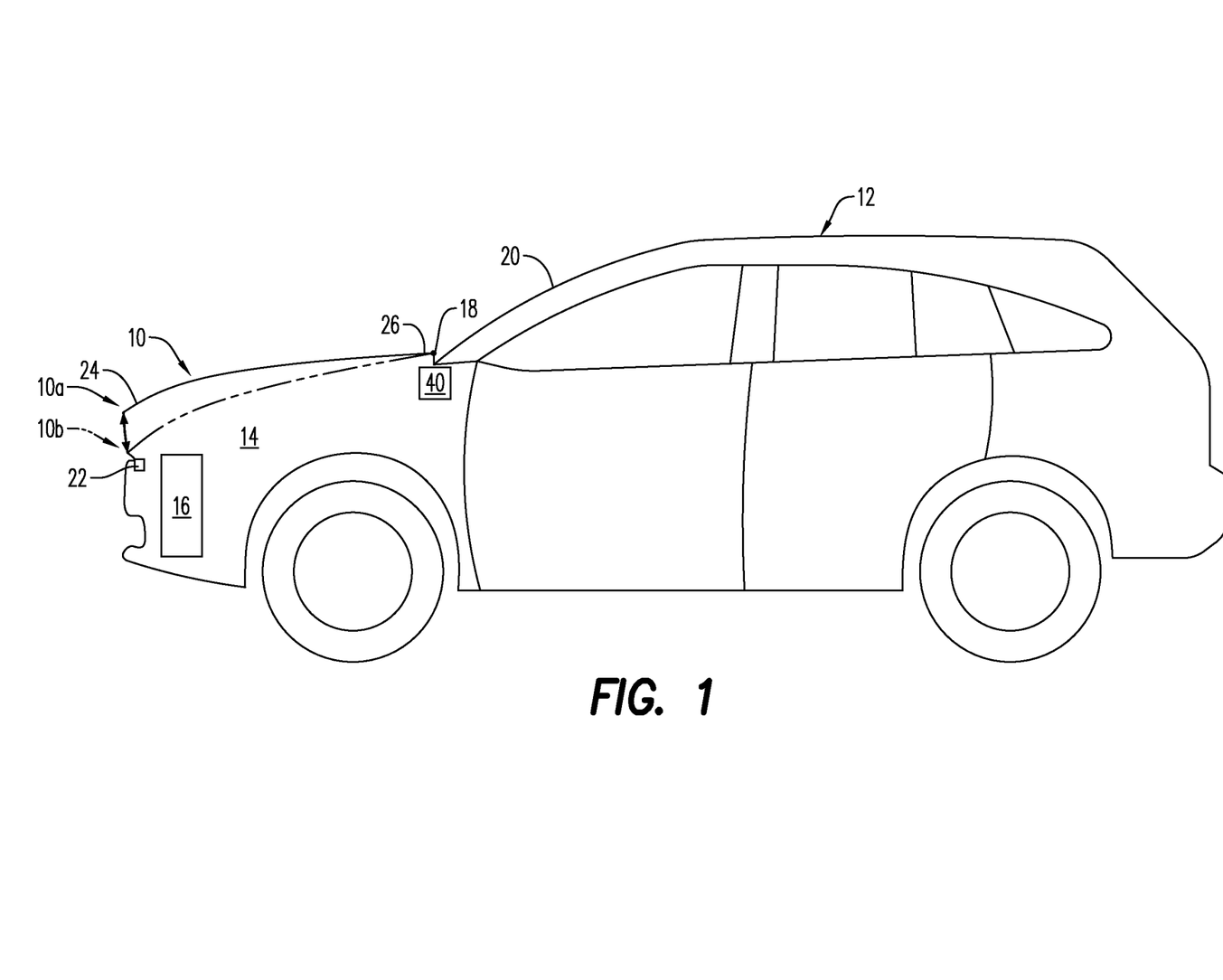
FIG. 1 is a schematic side view of a vehicle with an active front hood illustrating the alternative hood configurations according to a first exemplary embodiment of the disclosure.

Referring to FIG. 1, vehicle 12 includes an engine or front end compartment 14 housing a heat exchanger system 16 and engine (not shown) disposed rearward thereof. The heat exchanger system 16 includes a radiator, such as a flow through radiator in the exemplary embodiment, but other types of heat exchangers or radiators could of course also be utilized. Similarly, the location of the engine can also be modified as desired and the disclosure herein is not limited to any particular arrangement of components. The vehicle 12 further includes an active hood according to a first exemplary embodiment of the disclosure as generally shown by reference numeral 10. The active hood 10 has a first configuration 10a shown as a raised, more boxy styling and a second configuration 10b shown as a lowered, more aerodynamic position. The first configuration 10a of the hood 10 meets the visibility and aesthetic concerns of designers and owners by having a higher hood front that conveys a robust sporty appearance. The first configuration 10a is not, however, very aerodynamically effective because of the high front end 24 of the hood 10. Accordingly, the active hood 10 also has the second configuration 10b when deployed to improve the overall aerodynamic performance of the vehicle 12 and thereby provide better energy efficiency and an extended range. The second configuration 10b of the hood 10 is utilized primarily when the vehicle 12 is being driven at highway speeds and thus the visual impression of the vehicle is not a primary concern. That is, since the vehicle is travelling at a higher speed, it will not be seen for an extended period of time by a passerby as opposed to when the vehicle is parked, in a dealer showroom, or being driven at a slower speed.

The hood 10 is supported for pivoting movement in a manner known in the art such as by one or more hinges 18, an invisible hinge joint, a visible hinge or any similar pivot mechanisms disposed at the rear end 26 of the hood 10 proximal to the front windshield 20. One or more hood actuators 22 are operably coupled to the front region of hood 10 and are configured to raise and lower the front end 24 of the hood 10 relative to the front end compartment 14 between the raised and lowered positions 10a and 10b. The actuators 22 are known in the art such as, by way of example, an electric motor configured to operate a lifting element, a pneumatic cylinder, or the like. The vehicle 12 according to the first exemplary embodiment further includes a controller 40 in communication with the one or more hood actuators 22. The controller 40 is configured to control actuation of the hood actuators 22, and thus the positioning of the hood 10 in a raised or lowered configuration, in response to one or more detected vehicle conditions provided by sensors or other indicators. The detected vehicle conditions may include, for example, vehicle speed, vehicle operating temperature, ambient air temperature, road conditions, humidity, driving mode, GPS position, user input, and the like, or a combination thereof. Merely by way of example, the hood 10 may be in the raised first configuration when travelling at speeds less than approximately 35 mph and then lowered when the speed of the vehicle increases to highway speeds of more than approximately 45 mph. The hood may also be raised to the first configuration when excessive operating conditions are detected. A manual override to prevent controller 40 from actuating the hood actuators 22 may also be provided within the vehicle cabin for use by the driver, as well as a visual indicator such that the driver can readily ascertain the current position of the hood.

Figure 2:
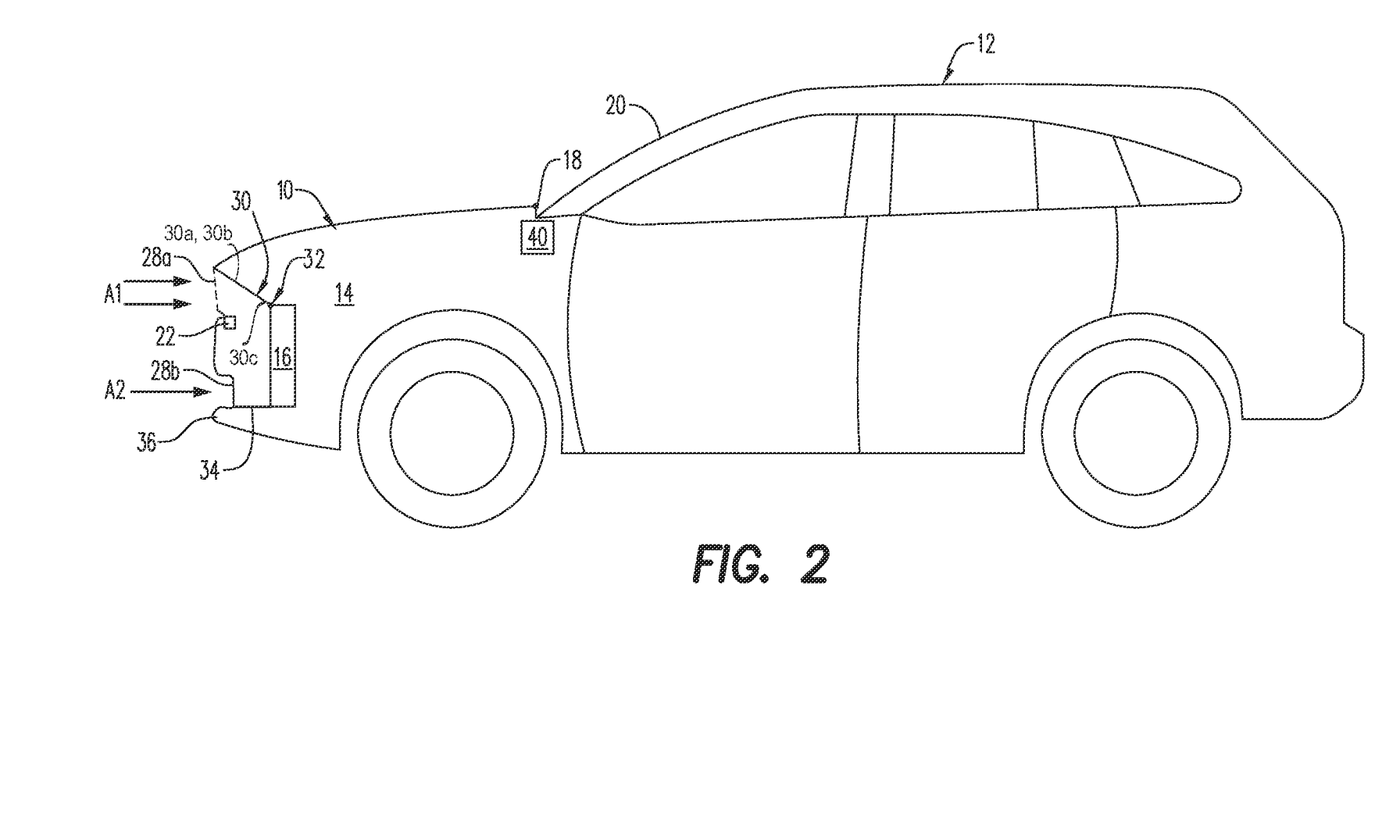
FIG. 2 is a schematic side view of the vehicle with the active front hood shown in FIG. 1 in a first configuration.

Referring to FIGS. 1 and 2, the active hood 10 is shown in the first configuration 10a which provides the raised, more boxy styling because the hood 10 is pivoted upwards about hinge 18. With the hood 10 in the first configuration 10a, air flow A1 is able to readily flow through upper front grill opening 28a and air flow A2 flows through lower front grill opening 28b, and thus through the heat exchanger system 16. Upper air guide 30 extends generally from the front end 24 of the hood 10 to a pivot point 32 relatively near the heat exchanger system 16. The upper air guide 30 extends across the entire upper area under the hood 10 (including both opposing sides 30a, 30b and the front guide 30c therebetween) so as to channel air flow A1 towards the heat exchanger 16 and restrict the oncoming ambient air from going elsewhere in the front end compartment 14. Similarly, a lower air guide 34 extends from the bumper 36 or lower edge of the lower front grill opening 28b to the lower end of the heat exchanger 16 or thereabouts to thus guide air A2 entering the lower front grill opening 28b towards the heat exchanger 16 and similarly restrict the oncoming ambient air from going elsewhere in the front end compartment 14. The lower air guide 34 also includes opposing sides guides and a front guide extending therebetween such that the air A2 is directed to the heat exchanger 16 and does not otherwise escape.

Figure 3:
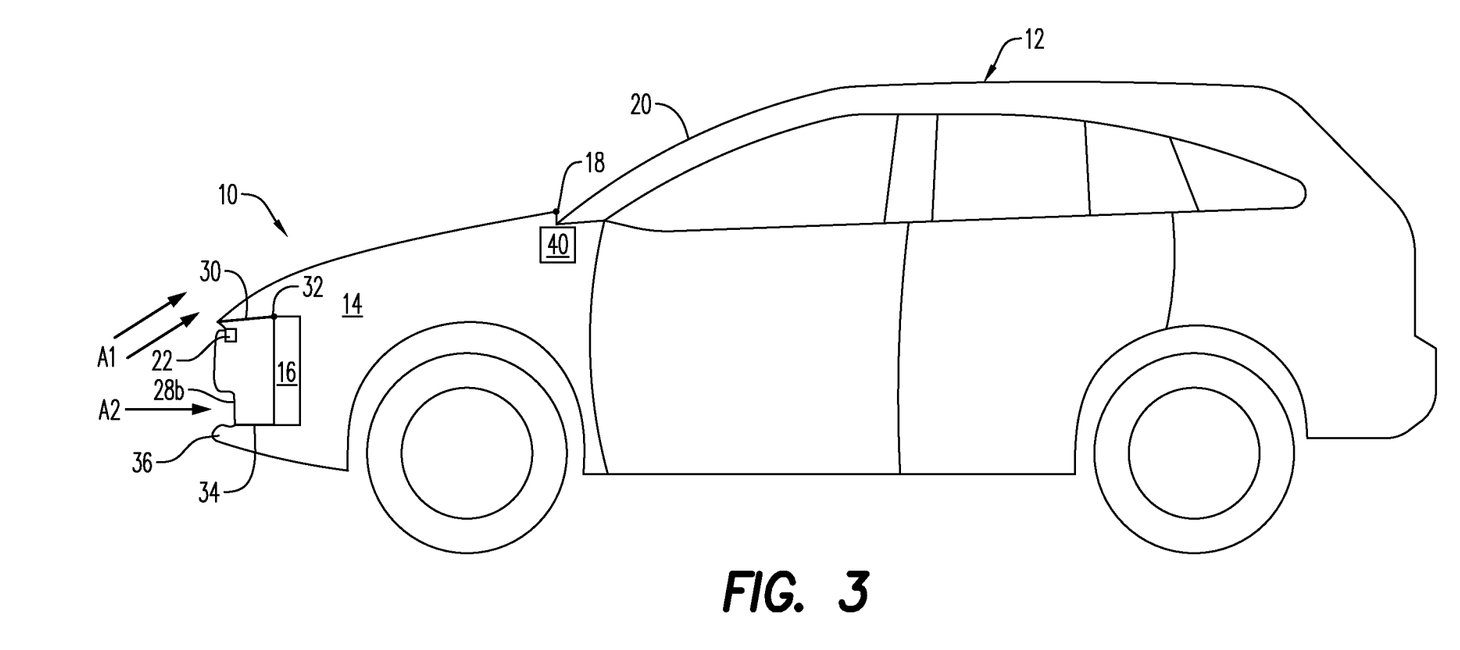
FIG. 3 is a schematic side view of the vehicle with the active front hood shown in FIG. 1 in a second configuration.

In FIG. 3, the active hood 10 is shown in the second configuration 10b which provides the lowered, aerodynamically effective performance with the hood 10 pivoted downwards about hinge 18. With the hood 10 in the second configuration 10b, the upper front grill opening 28a is effectively closed by the hood 10 and air A1 is prevented from flowing to the heat exchanger 16. As shown, when hood 10 moves to the lower second configuration position 10b, upper air guide 30 also pivots about the pivot point 32 with the movement of the hood 10. Thus, instead of entering the front end compartment and flowing through the heat exchanger 16, the oncoming air flow A1 is diverted upward and over the top of the hood 10. The passage of air flow A1 over the hood 10 creates less drag on the vehicle 12 when it is moving and thereby improves the overall aerodynamic performance of the vehicle 12. With the hood 10 in the second configuration 10b, the lower front grill opening 28b remains open and the lower air guide 34 continues to guide air A2 entering towards the heat exchanger 16.

As discussed above, at lower driving speeds or when parked the required cooling for the vehicle may be greater and the active hood 10 provides for increased air flow through the heat exchanger 16 since the first configuration allows air flow A1 into the upper front grill openings 28a, in addition to air flow A2 through the lower front grill openings 28b. Hence, the active hood 10 also functions as an air flow control or regulation mechanism having a first mode of operation whereby the hood 10 is raised and guides 30 direct exterior ambient air A1 entering through front grille openings 28a on the front of the vehicle to flow through the radiator 16 or other heat exchanger unit in a crossflow or perpendicular manner. The hood 10 further defines the air flow control mechanism as having a second mode of operation when the vehicle is travelling at higher speeds whereby the hood 10 is lowered and guides 30 substantially prevent the air flow A1 from reaching the radiator 16 or other heat exchanger unit. At higher driving speeds (i.e., when travelling at speeds greater than approximately 45 mph as mentioned above), less air flow is required for cooling the vehicle. Less air flow entering the front end compartment results in less drag on the vehicle, and thus increased performance is obtained at higher speeds of operation. Since the hood 10 can accomplish the first and second modes of air flow regulation by raising or lowering the front end 24 of the hood 10, the use of known active grille shutters or flaps, or any other type of movable control valve, arranged to redirect or block the airflow A1 and prevent the airflow A1 from passing through the heat exchanger unit 16 and/or into the front end compartment may be reduced or eliminated if desired.

Figure 4:
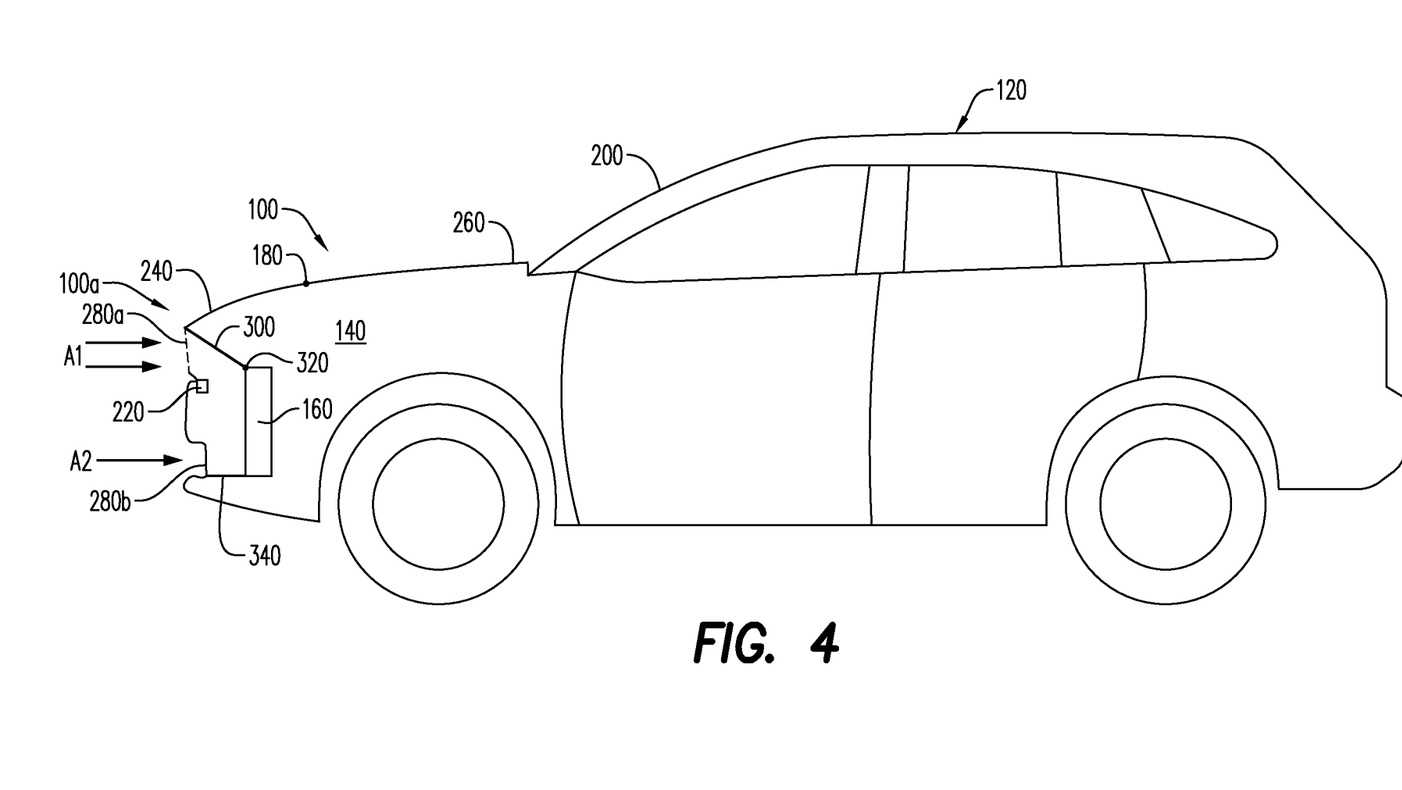
FIG. 4 is a schematic side view of the vehicle with an active front hood according to second exemplary embodiment of the disclosure in a first configuration.
Figure 5:
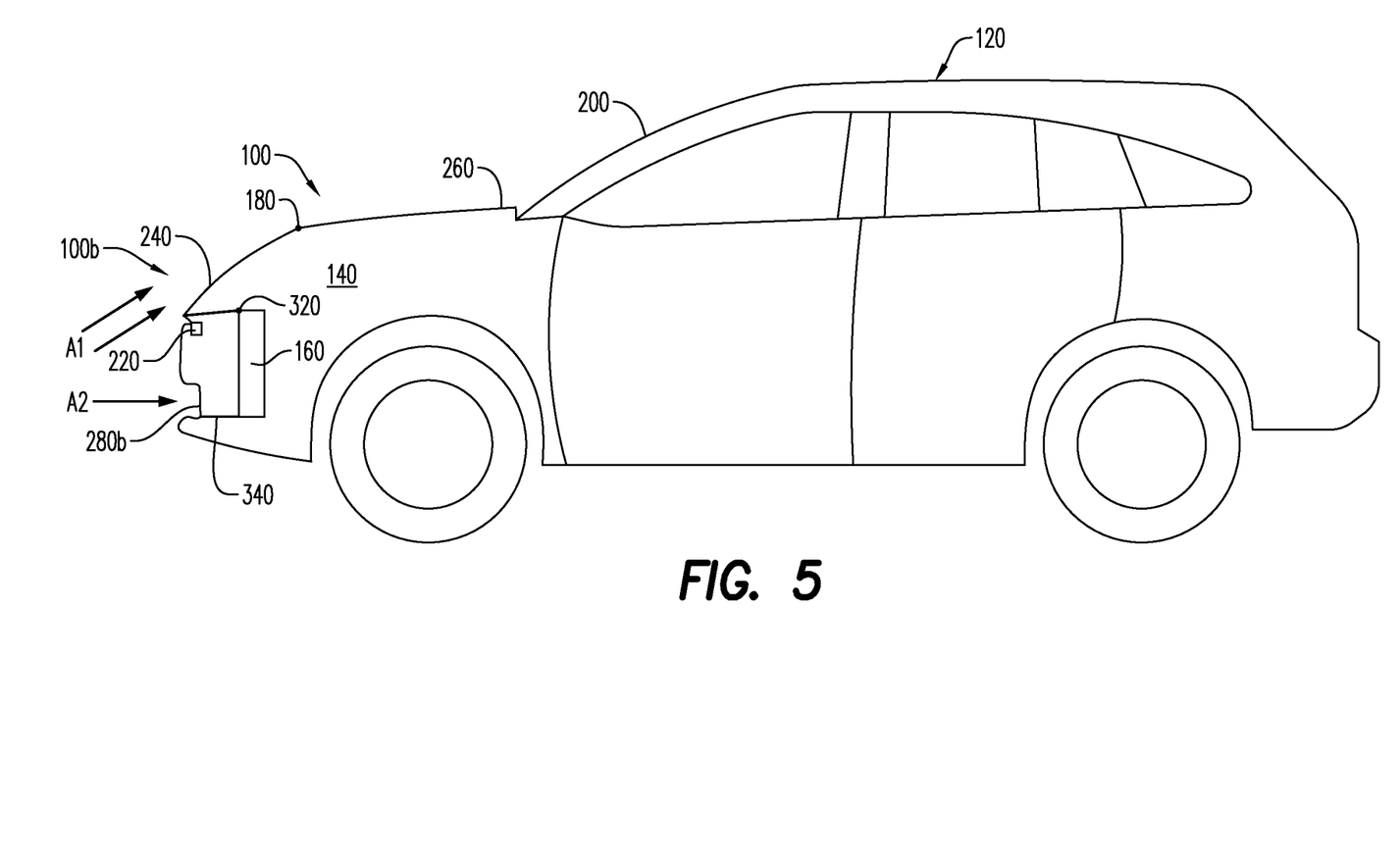
FIG. 5 is a schematic side view of the vehicle with the active front hood shown in FIG. 4 in a second configuration.

Referring to a second exemplary embodiment of the disclosure shown in FIGS. 4 and 5, vehicle 120 similarly includes a front end compartment 140 housing a heat exchanger system 160 and engine (not shown) disposed rearward thereof. The heat exchanger system 160 includes a radiator, such as a flow through radiator in the exemplary embodiment, but other types of heat exchanger systems and radiators could of course also be utilized. Similarly, the location of the engine can also be modified as desired and the disclosure herein is not limited to any particular arrangement of the vehicle components beneath the hood. The vehicle 120 further includes an active hood according to a second exemplary embodiment of the disclosure as generally shown by reference numeral 100. The active hood 100 has a first configuration 100a shown as a raised, more boxy styling and a second configuration 100b shown as a lowered, more aerodynamic position. The first configuration 100a of the hood 100 meets the visibility and aesthetic concerns of designers and owners by having a higher hood front that conveys a sporty appearance. The first configuration 100a is not, however, aerodynamically effective because of the high front end 240 of the hood 100. Accordingly, the active hood 100 also has the second configuration 100b when deployed to improve the overall aerodynamic performance of the vehicle 120 and thereby provide better fuel or battery economy. The second configuration 100b of the hood 100 is utilized primarily when the vehicle 120 is being driven at highway speeds and thus the visual impression of the vehicle when it is in use is not a great concern.

The hood 100 is supported for pivoting movement in a manner known in the art such as by one or more hinges 180, a seamless hinge joint, or similar pivot mechanisms disposed at a predetermined distance spaced between the rear end 260 of the hood proximal to the front windshield 200 and the front end 240. In an exemplary embodiment of the disclosure, the one or more hinges 180 are disposed approximately equidistant between the front end 240 and rear end 260 of the hood. The hinges 180 can be, however, at the rear end 260 of the hood at the base of the front windshield 200, which would mean that 100% of the hood length is hinged. Thus, by way of example, hinges 180 are spaced from the front end 240 by a distance corresponding to between 10-100% of the length of the hood 100 as measured from the front end 240 to the rear end 260. One or more hood actuators 220 are operably coupled to the front region of hood 100 and are configured to raise and lower the front end 240 of the hood 100 relative to the front end compartment 140 between the raised and lowered positions 100a and 100b. That is, the actuators 220 pivot only the front portion of the hood 100 about a hinge pivot axis defined by the hinge 180. The actuators 220 are known in the art such as, by way of example, an electric motor configured to operate a lifting element, a pneumatic cylinder, or the like.

In FIG. 5, the active hood 100 is shown in the second configuration 100b which provides the lowered, aerodynamically effective performance with the hood 100 pivoted downwards about hinge 180. With the hood 100 in the second configuration 100b, the upper front grill opening 280a is effectively eliminated by the hood 100 and air A1 is prevented from flowing to the heat exchanger 160. As shown, when hood 100 moves to the lower second configuration position 100b, upper air guide 300 also pivots about the pivot point 320 with the movement of the hood 100. Thus, instead of entering the front end compartment and flowing through the heat exchanger 160, the oncoming air flow A1 is diverted upward and over the top of the hood 100. The passage of air flow A1 over the hood 100 creates less drag on the vehicle 120 when it is moving and thereby improves the overall aerodynamic performance of the vehicle 120. With the hood 100 in the second configuration 100b, the lower front grill opening 280b remains open and the lower air guide 340 continues to guide air A2 entering towards the heat exchanger 16.

As discussed above, when parked or at lower driving speeds the required cooling for the vehicle is greater and the active hood 100 provides for increased air flow through the heat exchanger 160 since the first configuration allows air flow A1 into the upper front grill openings 280a, in addition to air flow A2 through the lower front grill openings 280b. Hence, the active hood 100 also functions as an air flow control or regulation mechanism having a first manner of operation whereby the hood 100 is raised and guides 300 direct exterior ambient air A1 entering through front grille openings 280a on the front of the vehicle to flow through the radiator 160 or other heat exchanger unit in a crossflow or perpendicular manner. The hood 100 further serves as an air flow control mechanism having a second manner of operation whereby the hood 100 is lowered and guides 300 prevent the air flow A1 from reaching the radiator 160 or other heat exchanger unit. Since the hood 100 can accomplish the first and second modes of operation by raising or lowering the front end 240 of the hood 100 about hinge pivot 180, the use of known active grille shutters or flaps, or any other type of movable control valve, arranged to redirect or block the airflow A1 and prevent the airflow A1 from passing through the heat exchanger unit 160 may be reduced or eliminated.

Figures 6, 7:
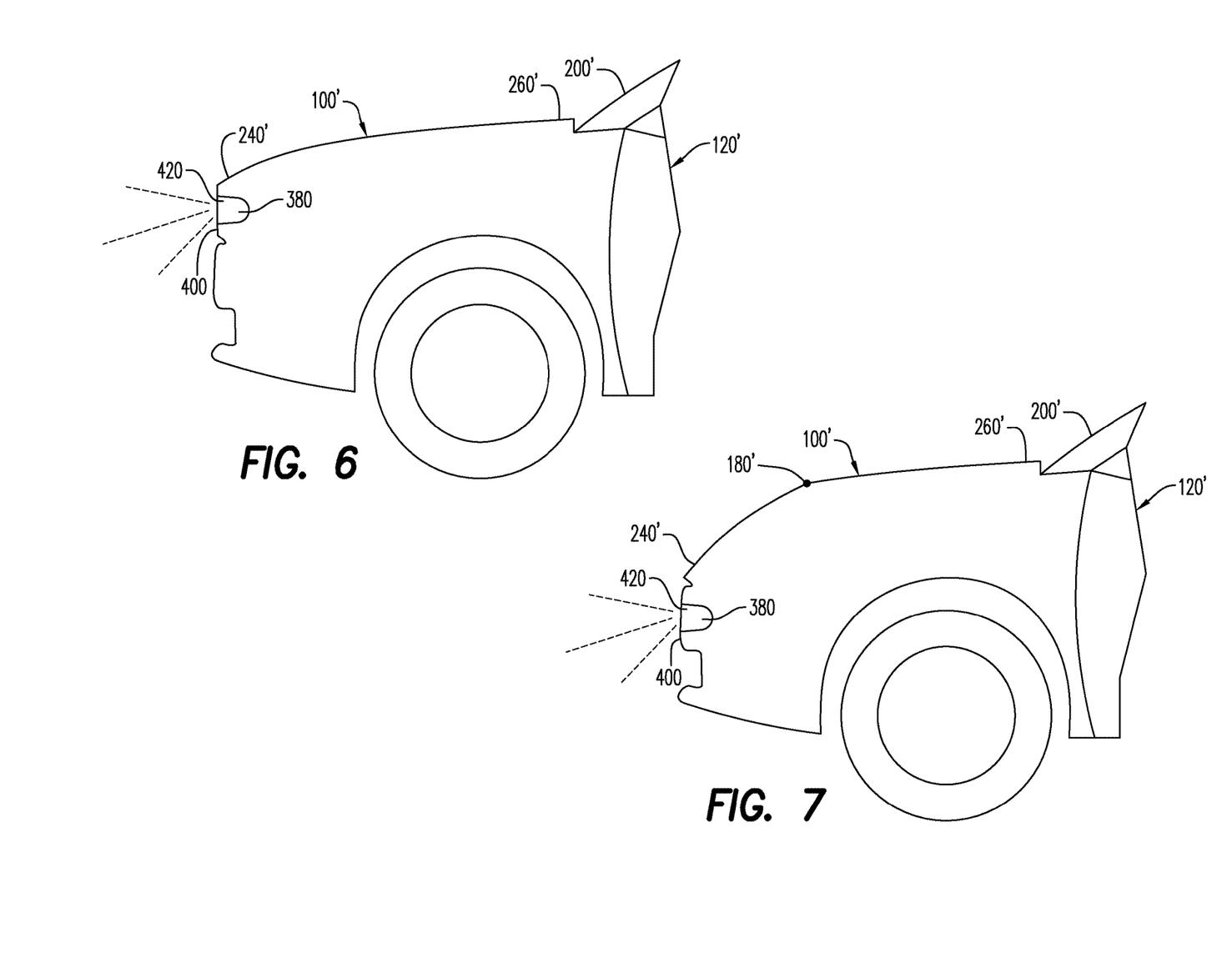
FIG. 6 is a schematic side view of the vehicle with an active front hood according to further exemplary embodiment of the disclosure in a first configuration.
FIG. 7 is a schematic side view of the vehicle with the active front hood shown in FIG. 6 in a second configuration.

FIGS. 6 and 7 illustrate a modification of the exemplary embodiments described above. The vehicle 120' includes an active hood according to a modified exemplary embodiment of the disclosure and is generally shown by reference numeral 100'. The active hood 100' has a first configuration shown in FIG. 6 as a raised, more boxy styling and a second configuration shown in FIG. 7 as a lowered, more aerodynamically effective position. The first configuration of the hood 100' (similar to the first configuration 10a of hood 10 in FIG. 1) meets the visibility and aesthetic concerns of designers and owners by having a higher hood front that conveys a sporty appearance. The first configuration of hood 100' is not, however, aerodynamically effective because of the high front end 240' of the hood 100'. Accordingly, the active hood 100' also has the second configuration (similar to the second configuration 10b of hood 10 in FIG. 1) to improve the overall aerodynamic performance of the vehicle 120' and thereby provide better fuel or battery economy. The second configuration of the hood 100' is utilized primarily when the vehicle 120' is being driven at highway speeds and thus the visual impression of the vehicle when it is in use is not as great of concern and the cooling requirements of the vehicle are lower.

The hood 100' according to the modified exemplary embodiment of the disclosure differs from the second exemplary embodiment of FIGS. 4 and 5 in that it also includes a lighting unit 380 secured to and displaced or moved together with the hood 100' from a first position as shown in FIG. 6 to a second position shown in FIG. 7. The front fascia 400 of the vehicle 120' also includes openings 420, 420' to allow light emitted from the lighting unit 380 to be visible. That is, when the hood 100' is in the raised first configuration, the lighting unit 380 is disposed in the first position and the illumination is visible though an upper fascia opening 420. Further, when the hood 100' is moved to the lower, second configuration, the lighting unit 380 connected to the hood 100' also moves to its lower second position. The illumination of the lighting unit 380 is then visible through a lower fascia opening 420'. Although illustrated relative to the second exemplary embodiment having a hood with a pivot hinge, one skilled in the art will understand that an active hood without a pivot hinge and with or without air flow guides can similarly be modified to include a lighting unit 380 or similar lighting device within the scope of the disclosure herein.

Figure 8A:
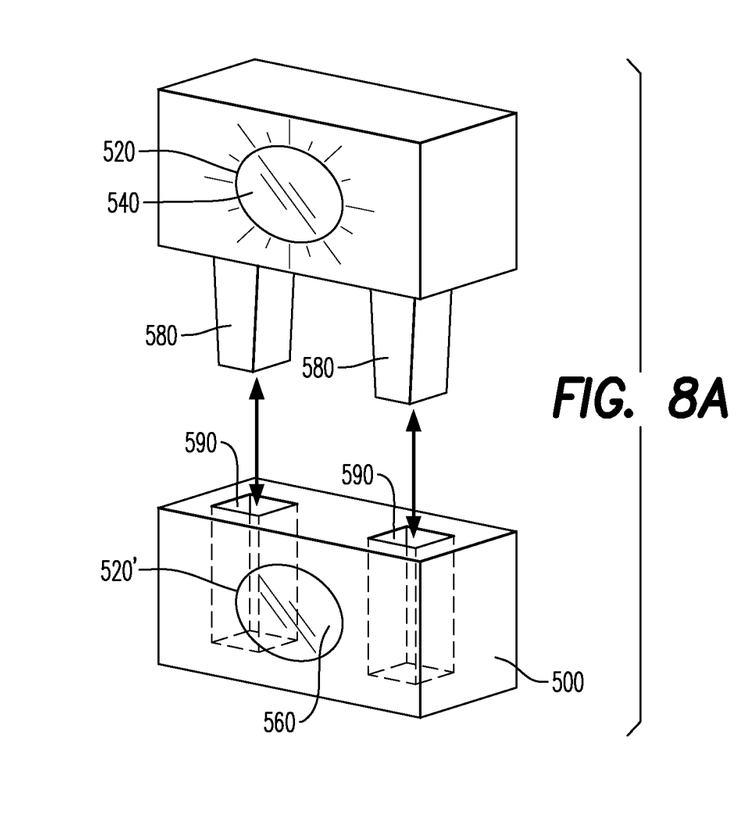
FIG. 8A is a schematic front view of the vehicle with an active front hood according to further exemplary embodiment of the disclosure in a first configuration.
Figure 8B:
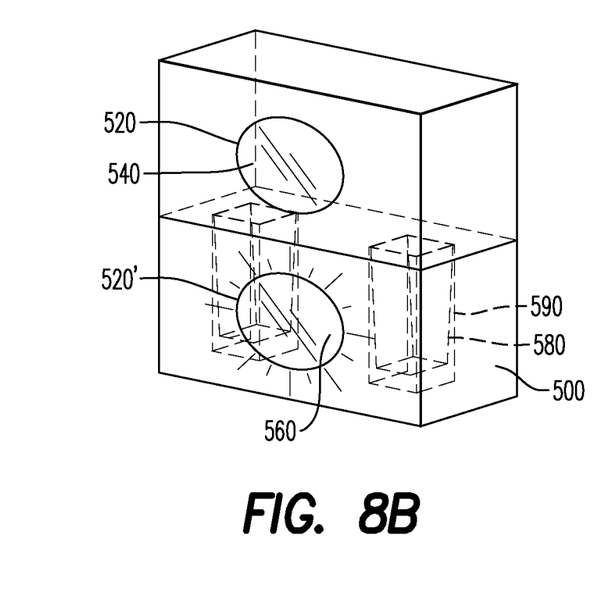
FIG. 8B is a schematic front view of the vehicle with an active front hood shown in FIG. 8A in a second configuration.

FIGS. 8A and 8B illustrate a modification of the exemplary embodiments described above. This modified exemplary embodiment of the disclosure differs from the exemplary embodiment of FIGS. 6 and 7 in that it includes an upper lighting unit 520 that is secured to the hood (not shown) and displaced or moved together with the hood as shown in FIG. 8A, with the second position being shown in FIG. 8B. This exemplary embodiment further includes a lower lighting unit 520' that is stationary and mounted on the vehicle. When the hood is in the raised first configuration, the upper lighting unit 520 is disposed in the first position and illumination of the upper lighting lamp 540 is visible though an opening in the upper fascia. In this configuration, the lower lighting lamp 560 within the lower lighting unit 520' may not be illuminated depending upon the specific design and driving conditions. The upper lighting unit 520 further includes one or more alignment guides 580 extending from a lower surface thereof. The lower lighting unit 520' similarly includes a corresponding number of openings 590 for receiving the guides 580 when the hood (not shown) moves to the lower, second configuration, as shown in FIG. 8B. When the hood is moved to the lower, second configuration, the upper lighting unit 520 connected to the hood also moves to its lower second position and the guides 580 are received within the openings 590. In the lower second configuration of the hood, the illumination of the lower lighting lamp 560 is visible through an opening in the lower fascia and the upper lighting lamp 540 may not be illuminated depending upon the specific design and circumstances. One skilled in the art will understand that the hood may be provided with or without a pivot hinge and with or without air flow guides, as discussed for the embodiments above, and can be further modified within the scope of the disclosure herein.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

We claim:

1. A vehicle comprising:
a vehicle hood disposed over a front end compartment of the vehicle, the hood having a front end and a rear end, the rear end being proximal to a front windshield area of the vehicle;
at least one hood actuator operably coupled to the hood, the at least one hood actuator being configured to move at least a portion of the hood relative to the front end compartment; and
a controller in communication with the at least one hood actuator, the controller being configured to control the at least one hood actuator in response to a predetermined vehicle operating condition;
wherein the hood includes an active hinge defining a hood pivot axis disposed between the front end and the rear end, whereby the at least one hood actuator is configured to move only a forward portion of the hood disposed between the active hinge and the front end of the hood; and
wherein the active hinge enables pivotal movement only of the forward portion of the hood.

2. The vehicle according to claim 1, wherein the at least one hood actuator is configured to pivot the forward portion of the hood about the hood pivot axis between a first raised position and second lower position.

3. The vehicle according to claim 2, further comprising an upper air guide, the upper air guide being secured between the hood and a pivot point connection within the front end compartment of the vehicle, the upper air guide being configured for movement together with the hood between a first configuration and second configuration;
wherein the first configuration of the upper air guide defines an air flow path for oncoming ambient air into the front end compartment when the hood is disposed in the first raised position, and the second configuration of the at least one air guide is configured to close the air flow path for oncoming ambient air into the front end compartment when the hood is disposed in the second lower position.

4. The vehicle according to claim 2, wherein the front end compartment accommodates a heat exchanger system therein, wherein the upper air guide extends from the front end of the hood to the heat exchanger system, the upper air guide configured to pivot about a hinge point proximal to the heat exchanger system between the first configuration and the second configuration.

5. The vehicle according to claim 1, further comprising a sensor in communication with the controller and configured to detect the predetermined vehicle operating condition.

6. The vehicle according to claim 1, further comprising at least one light emitting device secured to the hood and configured for movement together with the hood between a first position and a second position;
    wherein, when the hood is in a raised position, the at least one light emitting device is disposed in the first position and illumination from the at least one light emitting device is visible though an upper fascia opening; and
    wherein, when the hood is in a lower position, the at least one light emitting device is disposed in the second position and illumination from the at least one light emitting device is visible through a lower fascia opening.

7. An active front structure system for a vehicle comprising:
    a hood covering a front end compartment of the vehicle, the hood having a front end and a rear end, the rear end being proximal to a front windshield area of the vehicle;
    at least one actuator operably coupled to the hood and configured to move at least a portion of the hood between a first raised position and a second lower position; and
    at least one upper air guide secured to the hood and configured for movement together with the hood between a first configuration and second configuration, the first configuration of the at least one upper air guide defining an air flow path for oncoming ambient air into the front end compartment when the hood is disposed in the first raised position, and the second configuration of the at least one upper air guide being configured to close the air flow path for oncoming ambient air into the front end compartment when the hood is disposed in the second lower position.

8. The active hood system according to claim 7, wherein the at least one upper air guide extends from the front end of the hood to a pivot point proximal to an upper surface of the heat exchanger system.

9. The active hood system according to claim 8, wherein the at least one upper air guide includes opposing side air guides and a front guide extending therebetween.

10. The active hood system according to claim 7, further comprising a controller in communication with a sensor and configured to cause the actuator to move the hood between the first raised position and the second lower position in response to the detected condition.

11. The active hood system according to claim 7, wherein the hood includes an active hinge defining a hood pivot point disposed between the front end and the rear end, and wherein the at least one hood actuator is configured to pivot only a portion of the hood disposed between the active hinge and the front end of the hood.

12. The active hood system according to claim 11, wherein the at least one upper air guide extends from the front end of the hood to a guide pivot point proximal to an upper surface of the heat exchanger system.

13. The active hood system according to claim 12, wherein the at least one upper air guide includes opposing side air guides and a front guide extending therebetween.

14. A vehicle comprising:
    a hood disposed over a front end compartment of the vehicle, the hood having a front end and a rear end, the rear end being proximal to a front windshield area of the vehicle;
    at least one hood actuator operably coupled to the hood, the at least one hood actuator being configured to raise and lower at least a forward portion of the hood relative to the front end compartment;
    at least one light emitting device secured to the hood and configured to move together with the hood;
    wherein, when the hood is in a first raised configuration, the at least one light emitting device is disposed in a first position and illumination from the at least one light emitting device is visible though an upper opening of the vehicle.

15. The vehicle according to claim 14, wherein, when the hood is in a second lower configuration, the at least one light emitting device is disposed in the second position and illumination from the at least one light emitting device is visible through a lower fascia opening.

16. The vehicle according to claim 14, wherein the hood includes an active hinge defining a hood pivot axis disposed between the front end and the rear end, wherein the at least one hood actuator is configured to raise only a portion of the hood disposed between the active hinge and the front end of the hood to thereby define the first raised configuration of the hood, and wherein the at least one hood actuator is configured to lower only the portion of the hood disposed between the active hinge and the front end of the hood to thereby define the second lower configuration of the hood.

17. The vehicle according to claim 16, further comprising at least one upper air guide secured to the hood and configured for movement together with the hood between a first mode of operation and second mode of operation, the first mode of operation of the at least one upper air guide defining an air flow path for oncoming ambient air into the front end compartment when the hood is disposed in the first raised configuration, and the second mode of operation of the at least one upper air guide being configured to close the air flow path for oncoming ambient air into the front end compartment when the hood is disposed in the second lower configuration.

18. The vehicle according to claim 14, wherein the at least one light emitting device defines at least one upper light emitting device and further comprising at least one lower light emitting device, illumination from the at least one light lower emitting device being visible though a lower opening of the vehicle.

19. The vehicle according to claim 18, wherein the at least one upper light emitting device includes an alignment guide extending from a lower surface thereof and the at least one lower light emitting device includes an opening configured for receiving the alignment guide when the hood is disposed in a second lower configuration.

20. The vehicle according to claim 19, wherein the at least one upper light emitting device is configured for illumination when the hood is in the first raised configuration and the at least one lower light emitting device is configured for illumination when the hood is in the second lower configuration.

* * * * *